United States Patent [19]

Grindheim

[11] 4,391,146
[45] Jul. 5, 1983

[54] PARALLEL T IMPEDANCE MEASUREMENT CIRCUIT FOR USE WITH VARIABLE IMPEDANCE SENSOR

[75] Inventor: Earl A. Grindheim, Richfield, Minn.

[73] Assignee: Rosemount Inc., Minneapolis, Minn.

[21] Appl. No.: 269,415

[22] Filed: Jun. 1, 1981

[51] Int. Cl.³ .............................................. G01L 9/12
[52] U.S. Cl. .................................. 73/718; 324/57 Q; 324/60 C; 331/65; 331/142
[58] Field of Search ..................... 331/65, 142; 73/717, 73/718, 723, 724; 324/57 Q, 60 C, 60 R, 71 R

[56] References Cited

U.S. PATENT DOCUMENTS

| | | | |
|---|---|---|---|
| 2,106,785 | 2/1938 | Augustadt | 178/44 |
| 2,173,427 | 9/1939 | Scott | 250/36 |
| 2,319,965 | 5/1943 | Wise | 250/36 |
| 2,341,067 | 2/1944 | Wise | 250/36 |
| 2,423,505 | 7/1947 | Landon | 250/36 |
| 2,439,245 | 4/1948 | Dunn | 250/36 |
| 2,441,567 | 5/1948 | Darlington | 250/36 |
| 2,466,904 | 4/1949 | Lundstrom | 250/36 |
| 2,506,723 | 12/1947 | Larsen | 84/1.19 |
| 2,568,868 | 9/1951 | Pratt | 250/36 |
| 2,586,167 | 2/1952 | Kamm | 250/36 |
| 2,827,569 | 3/1958 | Jessen et al. | 250/36 |
| 2,927,282 | 3/1960 | Gardberg | 331/142 |
| 2,963,642 | 12/1960 | Arbogast et al. | 324/13 |
| 3,012,192 | 12/1961 | Lion | 324/57 |
| 3,049,675 | 8/1962 | Favin | 331/44 |
| 3,120,633 | 2/1964 | Bradford | 324/60 |
| 3,209,283 | 9/1965 | Clapper | 331/109 |
| 3,317,854 | 5/1967 | Liska et al. | 331/110 |
| 3,445,835 | 5/1969 | Fudaley | 340/258 |
| 3,446,075 | 5/1969 | Hecht | 73/718 |
| 3,535,430 | 10/1970 | Maynard | 84/1.08 |
| 3,555,448 | 1/1971 | Clarke et al. | 331/65 |
| 3,639,832 | 2/1972 | Goebbels | 324/34 R |
| 3,671,857 | 6/1972 | Bergmanis et al. | 324/61 QS |
| 3,746,975 | 7/1973 | Maltby | 324/65 R |
| 3,793,585 | 2/1974 | Wilska | 324/61 QS |
| 3,793,596 | 2/1974 | Grundy | 331/110 |
| 3,800,242 | 3/1974 | Zimmerman et al. | 331/66 |
| 3,815,050 | 6/1974 | Cowpland | 344/238 |
| 3,859,575 | 1/1975 | Lee et al. | 317/246 |
| 4,006,430 | 2/1977 | Meyer-Ebrecht | 331/65 |
| 4,091,683 | 5/1978 | Delatorre | 73/718 |
| 4,136,315 | 1/1979 | Kuhn | 819/659 |

OTHER PUBLICATIONS

Howard V. Malmstadt et al., *Optimization of Electronic Measurements*, 1974 pp. 47–63.
A. P. Bolle, "Theory of Twin-T RC-Networks and their Application to Oscillators," 1953, *Journal of the British Institution of Radio Engineers*, pp. 571–587.
Laurence G. Cowles, "The Parallel-T Resistance-Capacitance Network", 1956, *Proceedings of the I.R.E.*, pp. 1712–1717.
A. E. Hastings, "Analysis of a Resistance-Capacitance Parallel-T Network and Applications", *Proceedings of the I.R.E. and Wages and Electrons*, Mar. 1946, pp. 126–129.
P. M. Honnell, "Bridged-T Measurement of High Resistances at Radio Frequencies", *Proceedings of the I.R.E.*, Feb. 1940, pp. 88–90.
W. G. Sheppard, "Variable-Frequency Bridge-Type Frequency-Stablished Oscillators", *Proceedings of the I.R.E.*, Jun. 1943, pp. 256–268.
Leonard Stanton, "Theory and Application of Parallel-T Resistance-Capacitance Frequency-Selective Networks", *Proceedings of the I.R.E. and Waves and Electrons*, Jul. 1946, pp. 447–456.
W. N. Tuttle, "Bridged-T and Parallel-T Null Circuits for Measurements at Radio Frequencies", *Proceedings of the I.R.E.*, Jan. 1940, pp. 23–29.
N. Boutin et al., "The Misunderstood Twin-T Oscillator", *IEEE Circuits and Systems Magazine*, Dec. 1980, pp. 8–13.
H. H. Scott, "A New Type of Selective Circuit and Some Applications", *Proceedings* of the I.R.E., Feb. 1938, pp. 226–235.
Lion Research Corporation, "C-Line Precision Pressure Transducer Model PPT 811", two pages, undated.
Kurt S. Lion et al., "Nonlinear Twin-T Network for Capacitive Transducers", Reprinted from *The Review of Scientific Instruments*, vol. 35, Mar. 1964. pp. 353–356.

*Primary Examiner*—Howard A. Birmiel
*Attorney, Agent, or Firm*—Kinney, Lange, Braddock, Westman & Fairbairn

[57] ABSTRACT

A circuit for measuring a parameter to be sensed by means of at least one variable impedance sensor responsive to such parameter. The circuit includes a frequency determining means coupled to the variable sensor for providing an oscillatory frequency signal responsive to the impedance of the sensor, a signal amplifier coupled to the frequency determining means for amplifying the frequency signal to provide an output signal representative of the frequency signal and to sustain circuit oscillation, a signal detector coupled to the output signal to provide a control signal representative of such output signal, and a control coupled to receive the control signal and coupled to the frequency determining means thus allowing the oscillatory frequency signal of the circuit to oscillate at a frequency representative of the measured parameter.

34 Claims, 4 Drawing Figures

PARALLEL T IMPEDANCE MEASUREMENT CIRCUIT FOR USE WITH VARIABLE IMPEDANCE SENSOR

BACKGROUND OF THE INVENTION

1. Field of the Invention

The invention relates to a twin T (tee) or parallel T oscillator circuit for use with a variable impedance sensor to provide a signal representative of a desired parameter.

SUMMARY OF THE INVENTION

The present invention shows a parallel T circuit which comprises a frequency determining means, which includes a reactive sensor, and which provides an oscillating frequency signal. The frequency determining means is coupled to an amplifier, and an output signal from the amplifier then drives the frequency determining means to provide the frequency determining means with a suitable gain and phase shift to sustain oscillations. A signal detector is also coupled to the amplifier and provides an output control signal to a control means which is also coupled to the frequency determining means. The control means is responsive to the control signal and allows the oscillating frequency signal to oscillate at a frequency representative of a parameter which is sensed by the reactive sensor of the frequency determining means.

The output signal from the amplifier thus is representative of such parameter and is useful in several embodiments as explained herein and as are apparent to a skilled artisan's understanding from this disclosure.

DESCRIPTION OF THE PREFERRED EMBODIMENTS

Figure 1:
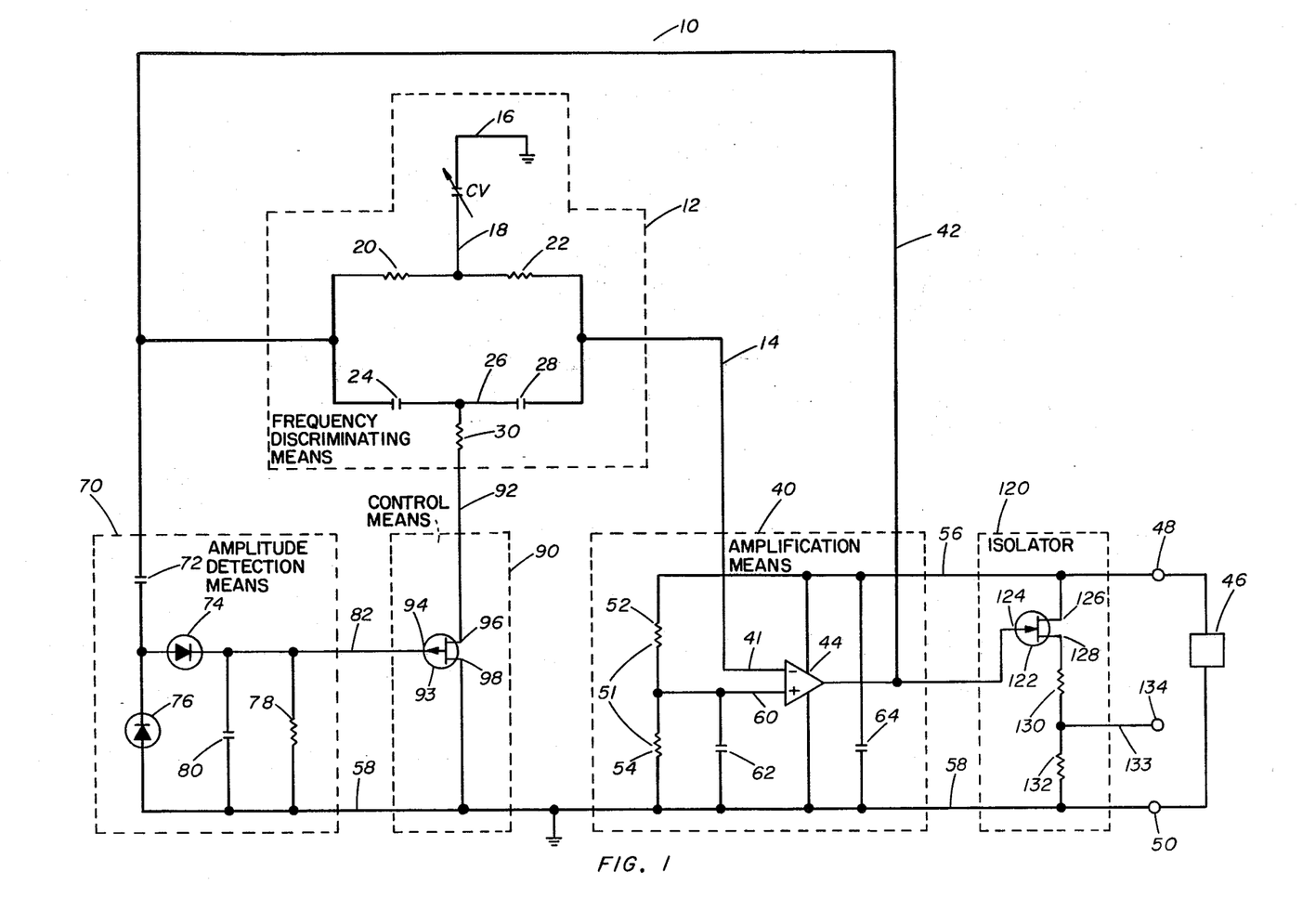
FIG. 1 is an electrical schematic diagram of an embodiment of the circuitry in accordance with the present invention.

FIG. 1 shows a circuit 10 which includes a frequency discriminating means 12 which preferably is a resistor-capacitor (RC) network but may be a resistor-inductor (RL) or a resistor-capacitor-inductor (RCL) network. Circuit 10 is commonly called a parallel T or twin T network. Discriminating means 12 includes a variable impedance sensor CV, which preferably is at least one variable capacitor which varies responsive to a stimulus but may be a combination of at least one inductor and at least one variable capacitor, at least one capacitor and at least one variable inductor or at least one variable inductor or a resistor. The stimulus preferably is, for example, pressure, temperature, acceleration, force or other condition to be sensed. The output of discriminating means 12 is a frequency signal, and this signal is carried by a line 14 to an amplification means 40 which amplifies the frequency signal. The output of amplification means 40 is coupled by a line 42 to an input of discriminating means 12 and to an amplitude detection means 70, which detects the peak to peak AC output signal on line 42 from amplification means 40 and rectifies the AC output signal to a direct current control signal. The control signal is applied across a line 58 and a line 82, which are coupled to a control means 90. Control means 90 is coupled to discriminating means 12 by a line 92 and allows discriminating means 12 to oscillate at any frequency within a selected range of frequencies as established by sensor CV and the other frequency determining components of discriminating means 12. In the preferred embodiment shown in FIG. 1, circuit 10 also inclues an isolator 120, which provides isolation for the output of amplification means 40.

Though other forms of a parallel T or twin T oscillator are satisfactory, in the preferred embodiment of FIG. 1 discriminating means 12 has a variable impedance sensor CV with one end coupled by line 16 to ground and a second end coupled by line 18 between two fixed resistors 20 and 22 connected in parallel with a pair of fixed impedance elements 24 and 28, which preferably are capacitors, between the discriminator input line 42 and its output line 14. Elements 24 and 28, as shown, preferably are fixed capacitors but may be inductors or a combination of capacitors and inductors. A fixed resistor 30 is connected to a line 26 which is coupled between impedance elements 24 and 26. The description of resistors 20, 22 as fixed and impedance elements 24, 28 as fixed is preferred. But, it is observed, that if they, separately or in combination with each other, were slightly variable with a parameter such as temperature and if they are selected to have a desired direction of change and magnitude, the parameter (temperature) coefficient of circuit 10, as a whole, including the sensor CV could be improved. In fact, the reason circuit 10 has a coefficient of temperature is that existent resistors and capacitors are not exactly fixed but do change responsive to external parameters such as temperature. The judicious selection of either resistors 20, 22 or impedance elements 24, 28 or both where they are not fixed but are intentionally variable, responsive to some parameter, usually temperature, is desirable.

Output line 14 of discriminating means 12 is coupled to the input of amplification means 40, which preferably comprises a first input 41 of an operational amplifier 44. Operational amplifier 44 preferably is an LM 118 as manufactured by National Semiconductor or can be discrete components including transistors, resistors, capacitors, etc. or can be a field effect transistor or other suitable amplifier. An external power supply 46 provides power to the circuit and to amplification means 40 through a pair of terminals 48 and 50. Two series resistors 52 and 54 comprise a voltage divider 51 which is coupled to terminals 48 and 50 by lines 56 and 58. Voltage divider 51 divides the voltage from power supply 46 to provide at a second (non-inverting) input 60 of amplifier 44 a set operating voltage for amplifer 44 so that a single external supply may be used instead of the dual, positive and negative voltage, power supply commonly used. It is observed that the dual supply could also be used. Capacitor 62 which is connected between non-inverting input 60 and line 58 ensures that the operating voltage impedance will be low. Capacitor 64 which is connected between lines 56 and 58 insures a low AC impedance of power supply 46 applied to terminals 48 and 50. Both capacitors, 62 and 64, thus prevent spurious amplifier oscillation. An output signal from amplifier 44 responsive to the signals at its input 41 and 60 is fed along line 42 as an input to discriminating means 12 and as an input to detection means 70.

Detection means 70 comprises a capacitor 72 which decouples the DC operating level from the output signal of amplifier 44; (i.e. the input to detection means 70) and couples the AC component on line 42 to first diode 74 and a second diode 76. Diodes 74 and 76 comprise a rectifier, which in a conventional manner, rectifies the AC component of the signal on line 42 to a DC control signal which is applied as a voltage control signal to a resistor 78 connected between lines 82 and 58. A capacitor 80 across resistor 78 serves as a ripple filter. Resistor 78 provides a well defined resistive load for the control signal which allows the control signal to follow downward and upward changes rapidly.

The DC control signal which appears across resistor 78 as a voltage is then coupled by line 58 and line 82 to control means 90, which in one preferred embodiment is a depletion mode, field effect transistor 93 having a gate 94 coupled to line 82, a drain 96 coupled to line 92, and, in turn, to fixed resistor 30, and a source 98 coupled to line 58. The DC control signal then varies the resistance of control means 90. That is, field effect transistor 93 is used as a voltage controlled resistor, under control of the gate 94 to source 98 voltage when the voltage from drain 96 to source 98 is a relatively low value, preferably below a few tenths of a volt.

The output signal from amplifier 44 is also coupled to isolator 120 which comprises a field effect transistor 122 having a gate 124 coupled to line 42, and a drain 126 coupled to line 56 and a source 128. Source 128 is coupled through two resistors 130 and 132 to line 58. The output from isolator 120 is a frequency signal on line 133, which preferably is picked off between resistors 130 and 132. The output of isolator 120 is thus available to readout, processing or other suitable circuitry from a suitable terminal 134 referenced to ground from terminal 50.

The circuit of FIG. 1 provides an electrical oscillator whose change of frequency of oscillation is representative of variable impedance sensor CV. Sensor CV is a shunt to ground between resistors 20 and 22. Resistor 30 preferably has a fixed resistance RF and control means 90, which preferably is an electrically variable resistor, has a variable resistance Rv. Control means 90 is coupled together in a series relationship with resistor 30 to form a shunt resistance Rs from line 26 to line 58. It is observed that line 58 is connected to ground. Circuit 10 performance is optimized when the following relationships are satisfied for the elements of such circuit:

| | |
|---|---|
| $R20 = R22$ | (Equation 1) |
| $Z24 = Z28$ | (Equation 2) |
| $Z24 = \frac{1}{2} CV1$ | (Equation 3) |
| $Rs = \frac{1}{2} R20$ | (Equation 4) |

Where:
$R20$ = the resistance of resistor 20.
$R22$ = the resistance of resistor 22.
$Z24$ = the impedance of impedance element 24.
$Z28$ = the impedance of impedance element 28.
$CV1$ = the impedance at minimum value of variable impedance CV.
$Rs$ = the effective resistance of resistor 30 (RF) and the effective resistance of control means 90 (Rv). (Equation 5)

The initial frequency signal of the oscillator f1 (in Hertz) is then determined by the circuit 10 in accord with:

$$f1 = \frac{1}{\pi R20 \sqrt{2(Z24)(CV1)}} \qquad \text{(Equation 6)}$$

A modified frequency of the oscillator f2 (in Hertz) is determined in accord with:

$$f2 = \frac{1}{\pi R20 \sqrt{2(Z24)(CV2)}} \qquad \text{(Equation 7)}$$

where: $CV2$ = the impedance of CV after it has varied in response to an external condition or stimulus.

It is observed that the actual frequency of oscillation will differ slightly from the value calculated by Equations 6 or 7 because of variations and imperfections of actual components and circuit connections and parasitic coupling between components and other factors in a compact practical assembly.

In one preferred embodiment of the present invention, the resistance of control means 90 (Rv) is designed to be increased in resistance as the amplitude of the oscillation increases in order to approach the value for Rs described in Equation 4. Upon the application of power to terminals 48 and 50 oscillations build up, the loss of discriminating means 12 increases, approaching an infinite loss and, concurrently, the phase shift produced on the signal passing through the network approaches positive one hundred eighty degrees (+180 degrees). As the phase shift approaches positive one hundred eighty degrees, the phase conditions for oscillation improve while the concurrent increase in network loss reduces the oscillation sustaining signal to the input of amplification means 40 thereby resulting in an equilibrium where the amplification will determine how close on the low resistance side of the ideal value of Rs the oscillator will operate. The oscillation frequency at that equilibrium is described by Equation (7) for ideal components. If the value of Rs is increased beyond the ideal of Equation (4) by some extraneous means, the phase shift will theoretically reverse to negative one hundred eighty degrees (−180 degress), thereby stopping the oscillation in the described circuit. If the extraneous perturbing interference is removed, the value of Rs will then return to a lower value and normal oscillation will resume.

Circuit 10 requires that amplification means 40 supply a positive one hundred eighty degree phase shift in addition to the positive one hundred eighty degree phase shift provided by the rest of the network to sustain oscillation. Line 14 carries the signal from discriminating means 12 to amplification means 40 which signal is shown connected to inverting input 41 thus providing the positive one hundred eighty degree phase shift needed from input signal to output signal along line 42.

The amplification (i.e. gain) of amplifier 44 is typically about four hundred times at 100 KHz and about four thousand times at 10 KHz. This gain value represents the state of the art for single chip monolithic amplifiers at this time. While higher gain amplifiers are desirable for reducing any effect amplifier variables will have on the oscillator frequency stability, nonetheless, for small, lower power assemblies such amplification factors are adequate.

In control means 90, field effect transistor 93 acts as a voltage controlled resistor under control of gate 94 to source 98 voltage when the instantaneous voltage across the drain 96 to source 98 is a relatively low value. The value of resistance of resistor 30 (RF) is selected so that the additional resistance of control means 90 (Rv) in its controllable region will be low enough to allow the circuit to oscillate at any frequency in the selected range of frequencies established by sensor CV and the other components of frequency determining means 12. The major portion of the total resistance (Rs) is concentrated in the fixed resistor 30 (RF), and the remaining portion is in control means 90 (Rv). As shown in Equation 5, the series connected resistor 30 (RF) and control means 90 (Rv) comprise total resistance Rs. The oscillatory voltage appearing on line 92 is thereby reduced by the resistance ratio Rv/Rs before being applied to the control means 90 (Rv). The reduced AC voltage at control means 90 (Rv) minimizes the non-linearity of the resistance value of control means 90 (Rv) for instantaneous voltages across drain 96 to source 98 of field effect transistor 93. For the particular embodiment in which field effect transistor 93 is a depletion mode, P channel, junction field effect transistor, the resistance of control means 90 (Rv) is increased when the DC control signal applied to gate 94 of the field effect transistor 93 is increased in the positive direction.

When the circuit 10 is not oscillating, as would be the case a moment after the power is applied, the DC control signal on gate 94 relative to the source 98 is at a zero value. At this point, the resistance value (Rv) of control means 90 is minimum and oscillation can begin. As the magnitude of oscillation increases, the gate 94 to source 98 voltage increases positively as a result of an increasing DC control signal from the amplitude detection means 70. The resistance of control means 90 (Rv) increases accordingly and introduces more loss into discriminating means 12. As the discriminating means 12 phase angle approaches positive one hundred eighty degrees, the oscillation build up is slowed until an equilibrium of magnitude and frequency is achieved. The correct selection of the resistance value (RF) of resistor 30 allows the range of resistance (Rv) of control means 90 to confine the magnitude of oscillation to a small amplitude which does not overload amplification means 40 or control means 90. As a result, the oscillatory waveform is essentially sinusoidal and the oscillator frequency depends essentially on the network components, which are chosen for stability.

The selection of the components and materials and the construction plan and method contribute to stability of the measurement in circuit 10. However, the stability of the frequency of oscillation is optimized through the use of control means 90 in which a particular resistor of the circuit 10 is continuously under control and varied to prevent electrically overloading other components, to avoid the generation of harmonics, and to avoid the introduction of unnecessary losses in the circuit operation. As a result of the control action, the oscillation is a substantially sinusoidal waveform for a desired range of values of sensor CV and the magnitude of the oscillation is substantially constant as well.

Figure 2:
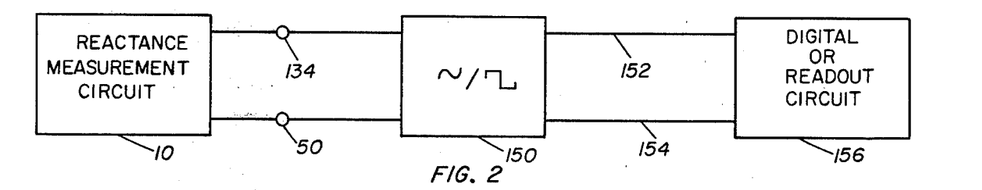
FIG. 2 is a block diagram representation of an embodiment of the present invention along with a block diagram representative of a suitable waveform shaper and readout circuitry.

In one typical embodiment as shown in FIG. 2, the output signal from circuit 10 from terminals 134 and 50 is applied to a waveform shaper 150 to convert the sine waveform to a square waveform of standardized amplitude with rise and fall times as specified for transistor-transistor-logic (TTL) circuits in digital electronic design. The square waveform is then transmitted as indicated schematically by lines 152 and 154 to digital or readout circuitry 156.

The output frequency signal at terminal 134, or its inverse function, (i.e. period) is a smooth continuous function of the sensor CV value. However, the value of impedance of the sensor CV will, in even the best designs, have some systematic errors which can be corrected out in the data automatically. The most common error source is the local temperature of the sensor CV and circuit components, except for the special case where sensor CV is itself a temperature sensor in which case only the local temperature of the circuit components are considered. To provide correction information, a second oscillator responsive to the physical error source (in this example temperature) is preferably used. The output frequency information of the second oscillator is used to correct the output signal from the first oscillator.

Figure 3:
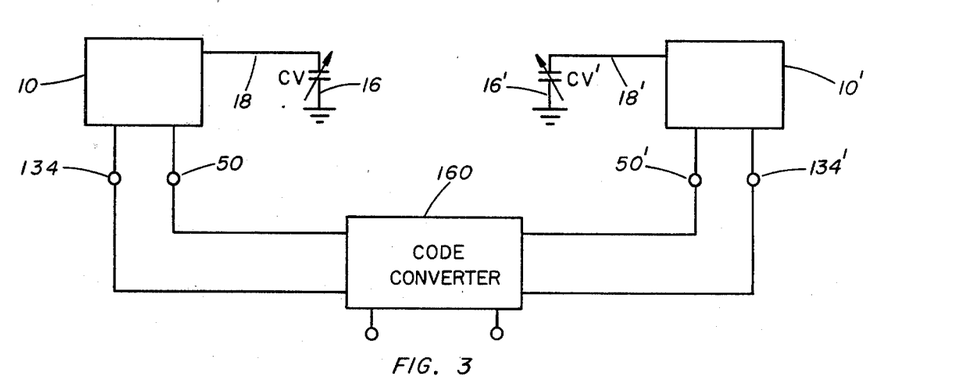
FIG. 3 is a block diagram of an embodiment of the present invention with two oscillators with the outputs therefrom coupled to a code converter.

As shown in FIG. 3, a second oscillator 10', which is numbered consistent with FIG. 1 except that all elements of second oscillator 10' are followed by the superscript prime symbol ('), is substantially the same as one preferred embodiment of FIG. 1 of the oscillator 10 except the sensor CV' of second oscillator 10', is responsive to the selected error source to some degree, more or less, in a monotonic manner and preferably is in close physical proximity to first oscillator 10 to experience substantially the same environment as first oscillator 10. In this preferred embodiment, the frequency of second oscillator 10' is interpreted as a temperature signal which is used to systematically modify the data from first oscillator 10 so that the local error effects of temperature on first oscillator 10 are reduced to the degree desirable. Second oscillator 10' need not necessarily respond in a linear representation of the error effect, but through the use of a code converter 160, which preferably includes a read only memory (ROM), the temperature frequency, for example, preferably addresses the correction code or signal in the ROM necessary to modify the information from first oscillator 10 in suitable auxiliary digital electronic circuitry of code converter 160. Converter 160 is provided with sufficient information as desired from the error effect temperature calibration.

Generally, it is a practical necessity to operate the second oscillator 10' at a frequency f2' preferably above or below the frequency range of the first oscillator 10 frequency (f2) to prevent interaction of the two oscillators or even locking of the two frequencies f2 and f2' together.

Another means to provide more accurate measurement of the external stimulus is to use two oscillators of the type described herein wherein the first oscillator is responsive to the external stimulus and the second oscillator is responsive to no external effect as completely as possible and to take the ratio of the two frequencies with external digital circuitry. The two oscillators are constructed substantially identically except for the sensors. The internal and local effects on the components are made nearly identical preferably by close proximity of the two oscillators in the same housing. The result is that aging effects of the components on the frequency ratio will be greatly reduced. In addition internal temperature changes due to turn-on warm-up will produce less effect on the ratio number. The ratio number is the measurement of the external stimuli in this concept.

Yet another embodiment for providing a more accurate measurement is the use of the ratio concept described above where the temperature sensitivity of the second oscillator is used separately to correct the ratio derived as described above. Even though the highest quality components are used in the oscillator circuit, there is some temperature sensitivity to the second supposedly immune oscillator. In addition to using the second oscillator to take a ratio with the first oscillator as described above, the second oscillator frequency may be used to address a ROM having correction information that may be used to modify the ratio number representation of the external stimulus to reduce the effect of temperature on sensor CV of the first oscillator.

Figure 4:
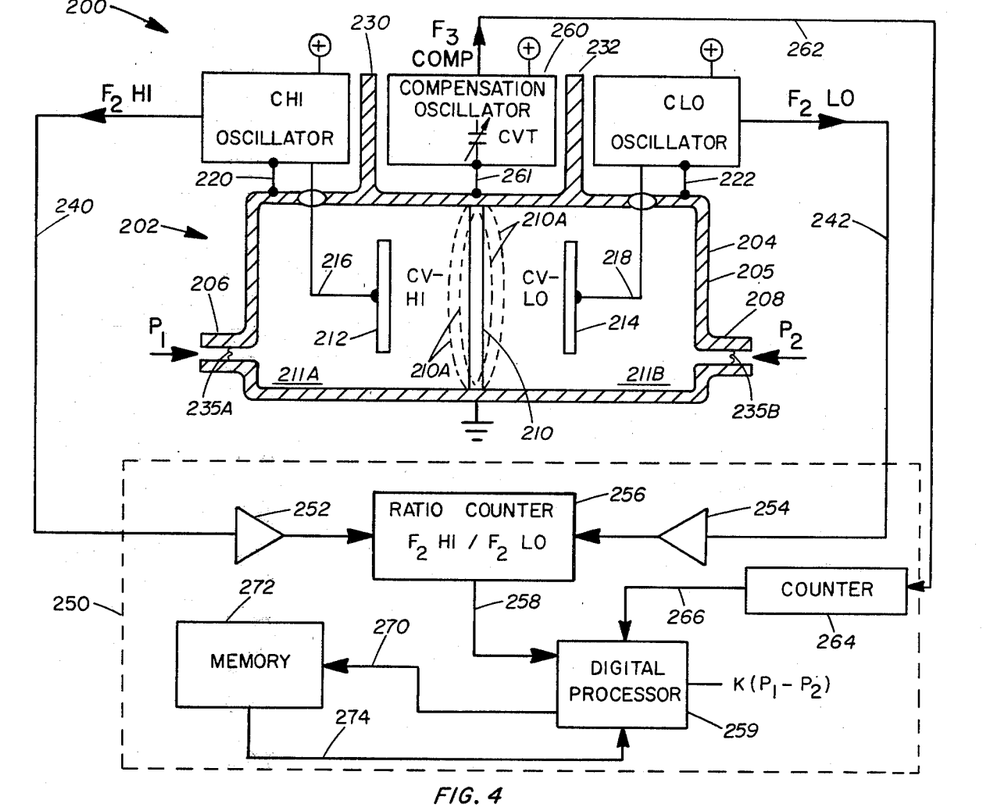
FIG. 4 shows a reactance sensor with three circuits in accordance with the present invention coupled thereto, and with the output signals from the circuits further coupled to signal processing circuitry.

FIG. 4 shows yet another embodiment of the present invention generally at 200. In this embodiment a sensing element is shown generally at 202. Sensing element 202 has a housing 204. Housing 204 is enclosed by a bulkhead 205 and preferably is used for receiving a differential stimuli such as pressure, but may also be used for absolute pressure or other conditions to be sensed. When pressure is the stimulus to be sensed, a first pressure port 206 and (for differential pressure) a second pressure port 208 are provided through bulkhead 205 in housing 204. When reactance sensor CV is a capacitor or for differential pressure, for example $P_1$ and $P_2$, a plurality of capacitors, a common diaphragm 210 is disposed in housing 204 to divide housing 204 into two chambers 211A and 211B such that ports 206 and 208 act on opposite sides of diaphragm 210 to deflect same from a rest position. Such deflection is generally indicated by dashed lines 210A. Diaphragm 210 in such embodiment preferably is at least partially conductive and preferably then is a common electrode for a first capacitor CV-HI and for a second capacitor CV-LO. A second electrode 212 is also disposed in chamber 211A and is preferably fixed in position such that varying pressure P, at first port 206 does not move electrode 212 relative to a rest position of diaphragm 210. Second electrode 212 preferably is also at least partially conductive and together with diaphragm 210 combines to form first capacitor CV-HI. A third electrode 214 similar in construction to second electrode 212 is disposed in chamber 211B of housing 204 on the opposite side of diaphragm 210. Third electrode 214 and diaphragm 210 then combine to form second capacitor CV-LO.

Suitable leadwires 216 and 218 are coupled to electrodes 212 and 214 respectively and such leadwires are then fed through bulkhead 205 of housing 204 in a known manner and are then coupled respectively to a first oscillator circuit CHI and a second oscillator circuit CLO. First oscillator circuit CHI and second oscillator circuit CLO are oscillators in accord with a preferred embodiment of FIG. 1. Diaphragm 210 may be similarly coupled to first and second oscillator circuits CHI and CLO, but for convenience when bulkhead 205 is formed from a conductive material, the conductive portion of diaphragm 210 is coupled to bulkhead 205 in a known manner and suitable connectors 220 and 222 are then connected between circuits CHI and CLO and to bulkhead 205. As shown in FIG. 4 bulkhead 205 of housing 204 preferably is grounded. The embodiment of FIG. 4 allows the two oscillator circuits CHI and CLO to operate electrically independently of each other. Each such oscillator, CHI and CLO is constructed substantially identical to the other except, as desired, for possible intentional differences in the values of resistors 20, 22 and impedance elements 24, 28; so that distinct, non-interfering frequencies f2 and f2' are obtained. Oscillator CHI and CLO preferably have substrates mounted on a thermally conductive structure such as the first and second protuberances 230 and 232 of bulkhead 205. The structure is preferably also thermally closely coupled to capacitors CV-HI and CV-LO to permit temperature compensation. The structure of housing 204 ensures that both circuits CHI and CLO experience very similar, if not identical, temperature environments and minimizes differences in the steady and transient temperature effects. The two oscillator circuits CHI and CLO also experience similar aging and line voltage effects. When two frequencies $F_2HI$ and $F_2LO$ of circuits CHI and CLO are taken as a ratio of one to the other, similar to the method described herein, the spurious effects cancel each other. In this present instance, however, the second oscillator circuit CLO is not simply a reference oscillator which is not responsive to the external stimulus, but is active and responsive to a desired stimulus.

First oscillator circuit CHI then provides output signal $F_2HI$ and second oscillator circuit CLO provides an output signal $F_2LO$, where $F_2HI$ and $F_2LO$ are determined in accordance with Equation (7). These signals $F_2HI$ and $F_2LO$ along lines 240 and 242 preferably are then sent to signal processing circuitry shown generally at 250. This circuitry may be a digital computing means, frequency to digital processing means or frequency to analog processing means or readout means. In one preferred embodiment shown in FIG. 4, signal $F_2HI$ is fed through a first buffer 252 and signal $F_2LO$ is fed through a second buffer 254, then both signals are fed to a ratio counter 256. Counter 256 then outputs a ratio signal on a line 258 representative of the ratio of the first output signal $F_2HI$ over the second signal $F_2LO$, e.g. $F_2HI/F_2LO$. This signal may be used directly or may be further processed as shown in a digital processor 259.

Additional oscillator circuits which provide compensation for a condition or other stimuli for which compensation is desired may also be included. Such oscillator is shown coupled to bulkhead 205 by a line 261 as a compensation oscillator 260 with a sensor which preferably is a variable capacitor CVT which is responsive to temperature. It is also observed that bulkhead 205 is coupled to ground and that suitable power connections are provided for oscillators CHI, CLO and compensation oscillator 260. Compensation oscillator 260, responsive to its stimulus then outputs a signal $F_3COMP$ on a line 262. This signal, $F_3COMP$ is then fed to a suitable counter 264. Counter 264 outputs a digital signal representative of the condition along a line 266 to digital processor 259. The processor 259 may then directly compensate the ratio of $F_2HI/F_2LO$ responsive to the signal on line 266 or may perform a look up function as along line 270 to a memory device 272 based on the signal on line 266. Memory device 272, then provides processor 259 with a signal along line 274 to compensate the ratio of $F_2HI/F_2LO$ representative of the stimuli of compensation oscillator 260. Processor 268 then outputs a compensated signal representative of the stimulus to the first oscillator CHI and of the stimulus to second oscillator CLO, representative of differential pressure of the form $K(P_1-P_2)$.

In many differential capacitor sensors such as shown in FIG. 4, both chambers 211A and 211B of housing 204 are filled with a fluid to permit the coupling of differential hydraulic forces to the common diaphragm from a more or less remote sealed differential pressure coupler thus filling the space between the capacitor electrodes 210 and 212. This requires known isolators as shown at 235A and 235B respectively. The fluid is selected for good electrical and hydraulic characteristics and serves to isolate the electrical capacitors from harsh external chemical environments. The fluid, however, affects the electrical reactance values. For example, when sensor CV-HI is a capacitor, as in one preferred embodiment of FIG. 4, the dielectric constant of the fluid typically is several times the value for air and consequently the dielectric value of each chamber 211A and 211B of the housing 204 is multiplied by the same fluid dielectric constant, since a common fluid type is used to fill the housing 204. The dielectric constant varies several percent with fluid temperature and thus the capacitance of capacitors CV-HI and CV-LO and thus the frequency of both oscillators CHI and CLO vary by a common multiplying factor with temperature. When the aforementioned ratio of the two oscillator's frequencies is taken, as at signal processing circuitry 250, the common dielectric effect multiplier cancels out and the variation of the dielectric constant does not affect the sensitivity of the desired external stimulus. Compensation oscillator 260 responsive to temperature thus provides a further improvement in accuracy, as it is thermally coupled to the same housing to sense the temperature of housing 204 and the two oscillators CHI and CLO. Since the environmental temperature will affect, to some extent, the characteristics of most good sensor designs in a systematic manner, the local temperature frequency is counted and used in digital form to modify the digital ratio from counter 256 to compensate for temperature effects.

Certain desirable features of the present invention, which with a circuit 10 for an impedance sensor measuring instrument, are:

(1) The sensor, CV, preferably has one terminal grounded, thereby simplifying the mechanical design of the sensor responsive to external stimulus.

(2) The DC current path, line 42 through resistors 20 and 22 to line 14 through circuit 10 from input to output of amplification means 40, stabilizes the operating point of amplification means 40, without additional components.

(3) The impedance branch of discriminating means 12, line 42 through impedance elements 24 and 28 to line 14, blocks DC voltage from control means 90, thereby allowing control means 90 to act as a voltage controlled resistor.

(4) The phase angle function of discriminating means 12 on the signal through the network varies from a positive one hundred eighty degrees to a negative one hundred eighty degrees as Rs is increased to the null point, greatly reducing the influence the amplifier 40 has on the oscillation frequency.

(5) In one preferred embodiment of FIG. 1, discriminating means 12 is comprised of resistors and capacitors only which are components available in physically small sizes, thereby allowing assembly techniques to be used which result in component and wiring rigidity as well as small size both of which enhance stable performances.

(6) The equations governing the circuit 10 allow the frequency of oscillation to be compatible with a sensor CV which is readily manufacturable as a variable sensor capacitor or other variable impedance sensors of pressure, temperature, acceleration, force, density, etc., and the threshold of oscillation is controlled by a control means 90 which is available in an electrically controllable form as field effect transistor 93.

In addition to the desirable features listed, other advantages are apparent to those skilled in the art. The components selected for the design must have excellent properties to result in a circuit having long term stability. As is apparent to a skilled artisan, components of various types and values may be used. A list of components of one embodiment of FIG. 1 of the invention that performed well follows:

| Component | Description |
| --- | --- |
| Resistors 20,22 | 200 kilohms |
| Resistor 30 | 80 kilohms |
| Resistor 78 | 1 Megohm |
| Resistors 130,132 | 8 kilohms |
| Resistors 52,54 | 20 kilohms |
| Capacitors 24,28 | 6.2 picofarads |
| Capacitor 72 | 4700 picofarads |
| Capacitor 80 | 4700 picofarads |
| Capacitor 64 | .1 microfarad |
| Capacitor 62 | .01 microfarad |
| Amplifier 44 | LM 118LID Amperex* |
| Diodes 74,76 | LDD-15 Amperex* |
| Transistor 93 | 2N2609LID Amperex* |
| Transistor 122 | 2N4858LID Amperex* |

*AMPEREX is a trademark of Amperex Electronic Corp., Providence Pke., Slatersville, R.I. 02876

What I claim is:

1. A parallel T oscillator circuit for providing an output signal having a frequency representative of a variable impedance which is reponsive to a parameter to be sensed, the circuit comprising:
    frequency determining means, coupled to the variable impedance to form a parallel T circuit having an input and an output, for providing at the output an oscillatory frequency signal having a frequency which is a function of the variable impedance;
    signal amplification means for amplifying the oscillatory frequency signal to provide the output signal, the signal amplification means having an input coupled to the output of the parallel T circuit for receiving the oscillatory frequency signal and having an output for providing the output signal, the output of the signal amplification means being coupled to the input of the parallel T circuit to sustain oscillation of the frequency determining means;
    detection means coupled to the output of the signal amplification means for providing a direct current control signal which is a function of amplitude of the output signal; and
    control means, responsive to the control signal and coupled to the frequency determining means, for enabling the oscillatory frequency signal to oscillate at a frequency representative of the variable impedance.

2. A circuit according to claim 1 wherein the variable impedance comprises at least one variable capacitor.

3. A circuit according to claim 2 wherein the frequency determining means comprises a resistance network coupled to the variable imepdance and a fixed impedance network coupled together to the control means to comprise the parallel T network.

4. A circuit according to claim 3 wherein the variable capacitor has a known minimum capacitance and wherein the resistance network, the fixed impedance network and the minimum capacitance of the variable capacitor determine an initial frequency of the oscillatory frequency signal and the variable capacitor varies from the minimum capacitance in response to the parameter to be sensed thus varying the frequency of the oscillatory frequency signal from the initial frequency.

5. A circuit according to claim 3 wherein the resistance network comprises at least two resistors coupled together and wherein a terminal of the variable capacitor is coupled therebetween.

6. A circuit according to claim 5 wherein the fixed impedance network comprises at least two fixed capacitors connected together and wherein the control means is coupled therebetween.

7. A circuit according to claim 6 wherein the combination of the resistors of the resistance network and the variable capacitor and the combination of the fixed capacitors, of the fixed impedance network are coupled in parallel.

8. A circuit according to claim 3 wherein the detection means comprises rectification means for rectifying the output signal to produce the direct current control signal.

9. A circuit according to claim 8 wherein the rectification means comprises at least one diode.

10. A circuit according to claim 8 wherein the detection means further comprises an AC coupling means for coupling the output signal from the signal amplification means to the rectification means.

11. A circuit according to claim 9 wherein the detection means further comprises an AC coupling means for isolating the direct current operating level of the output signal from the detection means.

12. A circuit according to claim 8 wherein the detection means further comprises a filter means coupled to the rectification means for smoothing the direct current control signal.

13. A circuit according to claim 12 wherein the filter means comprises at least one capacitor.

14. A circuit according to claim 1 wherein the control means is coupled to the frequency determining means to provide a controllable impedance which is varied as a function of the control signal to control an oscillatory condition of the frequency determining means.

15. A circuit according to claim 14 wherein the control means is a depletion mode, field effect transistor.

16. A circuit according to claim 15 wherein the depletion mode, field effect transistor has a drain, a source and a gate.

17. A circuit according to claim 16 wherein the gate receives the direct current control signal and the drain is coupled to the frequency determining means.

18. A circuit according to claim 14 wherein the control means provides an adjustable resistance responsive to the direct current control signal to the frequency determining means.

19. A circuit according to claims 3, 7, 8, 15, 16 or 18 further comprising isolation means coupled to the output of the signal amplification means for reducing effects of external loading on the circuit.

20. A circuit for measuring the capacitance of a variable capacitor which is responsive to an external stimulus, the circuit comprising:
a parallel T network including the variable capacitor, the network having an input, an output and a characteristic impedance, for providing a frequency signal at the output which has a frequency and amplitude representative of the external stimulus;
signal amplification means coupled to output of the parallel T network for providing to the input of the parallel T network an alternating current output signal representative of the frequency signal;
detection means coupled to the amplification means for rectifying the alternating current output signal to produce a direct current control signal which is a function of the amplitude of the output signal; and
control means coupled to the parallel T network for changing the characteristic impedance of the parallel T network responsive to the control signal to enable the frequency signal to oscillate at a frequency representative of the external stimulus.

21. A circuit according to claim 20 wherein the control means is a variable resistance.

22. A circuit according to claim 20 wherein the control means is a depletion mode, field effect transistor.

23. A circuit according to claim 22 wherein the field effect transistor has a drain, a source, and a gate, and wherein the gate receives the control signal to change resistance between the drain to source responsive to the control signal.

24. A circuit according to claim 20 wherein the control means is a junction field effect transistor.

25. A circuit for providing an output which is a function of first and second parameters, the circuit comprising
a first circuit for producing a first parameter output signal having a frequency representative of the first parameter, the first circuit comprising:
first variable impedance sensor means for sensing the first parameter, the first variable impedance sensor means having a first variable impedance which is a function of the first parameter;
first frequency determining means, coupled to the first variable impedance sensor means to form a first parallel T circuit having an input and output, for providing at the output a first oscillatory frequency signal having a frequency which is a function of the first variable impedance;
first signal amplification means for amplifying the first oscillatory frequency signal to produce the first parameter output signal, the first signal amplification means having an input coupled to the output of the first parallel T circuit for receiving the first oscillatory frequency signal and having an output for providing the first parameter output signal, the output of the first signal amplification means being coupled to the input of the first parallel T circuit to sustain oscillation of the first parallel T circuit;
first detection means coupled to the output of the first signal amplification means for providing a direct current first control signal which is a function of amplitude of the first parameter output signal; and
first control means responsive to the first control signal and coupled to the first frequency determining means for enabling the first oscillatory frequency signal to oscillate at a frequency representative of the first variable impedance;
a second circuit for producing a second parameter output signal having a frequency representative of the second parameter, the second circuit comprising:
second variable impedance sensor means for sensing the second parameter, the second variable impedance sensor means having a second variable impedance which is a function of the second parameter;

second frequency determining means, coupled to the second variable impedance sensor means to form a second parallel T circuit having an input and output, for providing at the output a second oscillatory frequency signal having a frequency which is a function of the second variable impedance;

second signal amplification means for amplifying the second oscillatory frequency signal to produce the second parameter output signal, the second signal amplification means having an input coupled to the output of the second parallel T circuit for receiving the oscillatory frequency signal and having an output for providing the second parameter output signal, the ouput of the second signal amplification means being coupled to the input of the second parallel T circuit to sustain oscillation of the second parallel T circuit;

second detection means coupled to the output of the second signal amplification means for providing a direct current second control signal which is a function of amplitude of the second parameter output signal; and second control means responsive to the second control signal and coupled to the second frequency determining means for enabling the second oscillatory frequency signal to oscillate at a frequency representative of the second variable impedance; and processor means responsive to the first and second parameter output signals for providing the output which is a function of the first and second parameters.

26. A circuit according to claims 25 and further comprising memory means coupled to the processor means for storing compensation data for the first parameter output signal based upon the second parameter output signal.

27. A circuit according to claim 26 and further comprising lock up means coupled to the second parameter output signal and coupled to the memory means for locating in the memory means the compensation data based upon the second parameter output signal.

28. A circuit according to claim 27 wherein the processor means combines the compensation data based upon the second parameter output signal and the first parameter output signal to provide a compensated first parameter output signal as the output which is a function of the first and second parameters.

29. A circuit according to claim 28 wherein the first parameter is pressure.

30. A circuit according to claim 29 wherein the output is representative of a differential pressure comprising at least a first and a second pressure, and the first parameter is the first pressure and the second parameter is the second pressure.

31. A circuit according to claim 29 wherein the second parameter is temperature.

32. A circuit according to claim 29 wherein the second parameter is a function of an environment to which the first and second sensor means are exposed.

33. A circuit according to claim 30 wherein the second parameter is a reference condition.

34. A circuit for providing an output signal having a frequency which is representative of a sensed parameter, the circuit comprising:

sensing means for sensing the parameter, the sensing means exhibiting a variable impedance which is a function of the parameter;

controllable impedance means for providing a controllable impedance which is a function of a direct current control signal;

frequency determining means, connected to the sensing means and the controllable impedance means to form a parallel T circuit, for receiving the output signal and providing an oscillatory frequency signal which has a frequency which is a function of the variable impedance and the controllable impedance;

signal amplification means for amplifying the oscillatory frequency signal to produce the output signal; and detection means for providing the direct current control signal to the controllable impedance means as a function of amplitude of the output signal.

* * * * *